(12) United States Patent
Tao et al.

(10) Patent No.: US 9,997,941 B2
(45) Date of Patent: Jun. 12, 2018

(54) CHARGING AND DISCHARGING SYSTEM AND METHOD, AND PHOTOVOLTAIC POWER GENERATION SYSTEM

(71) Applicant: SUNGROW POWER SUPPLY CO., LTD., Hefei (CN)

(72) Inventors: Lei Tao, Hefei (CN); Nianan Pan, Hefei (CN); Jigui Feng, Hefei (CN); Haiyan Zou, Hefei (CN)

(73) Assignee: SUNGROW POWER SUPPLY CO., LTD., Hefei (CN)

( * ) Notice: Subject to any disclaimer, the term of this patent is extended or adjusted under 35 U.S.C. 154(b) by 349 days.

(21) Appl. No.: 14/813,809

(22) Filed: Jul. 30, 2015

(65) Prior Publication Data

US 2016/0064985 A1 Mar. 3, 2016

(30) Foreign Application Priority Data

Aug. 29, 2014 (CN) .......................... 2014 1 0436633

(51) Int. Cl.
*H02J 7/00* (2006.01)
*G05F 5/00* (2006.01)
(Continued)

(52) U.S. Cl.
CPC ............ *H02J 7/0068* (2013.01); *H02J 3/383* (2013.01); *H02J 7/345* (2013.01); *H02J 7/35* (2013.01);
(Continued)

(58) Field of Classification Search
CPC .. H02J 7/35; H02J 7/355; H02J 7/0068; H02J 3/383; H02J 7/345; H02J 9/062;
(Continued)

(56) References Cited

U.S. PATENT DOCUMENTS

2003/0206424 A1* 11/2003 Jungreis .................... H02J 7/34
                                                                  363/125
2009/0152947 A1*  6/2009 Wang ........................ H02J 1/14
                                                                   307/24
(Continued)

FOREIGN PATENT DOCUMENTS

CN          103457514 A      12/2013
CN          103855790 A       6/2014
(Continued)

OTHER PUBLICATIONS

European Search Report dated Jan. 26, 2016 for European Patent Application No. 15178958.3.
(Continued)

*Primary Examiner* — Yalkew Fantu
*Assistant Examiner* — Mohammed J Sharief
(74) *Attorney, Agent, or Firm* — Conley Rose, P.C.

(57) ABSTRACT

A charging and discharging system, a charging and discharging method, and a photovoltaic power generation system are provided. The charging and discharging system includes: a unidirectional converter, a unidirectional switch, an energy storage device and a controller; where an input terminal of the unidirectional converter is connected to an output terminal of a photovoltaic device of a photovoltaic power generation system to which the charging and discharging system is applied, and an output terminal of the unidirectional converter is connected to an input terminal of the energy storage device; the unidirectional switch is connected between an output terminal of the energy storage device and an input terminal of a bidirectional inverter of the photovoltaic power generation system to which the charging and discharging system is applied; the controller is connected to the unidirectional converter, the unidirectional switch, the energy storage device and the bidirectional inverter.

15 Claims, 4 Drawing Sheets

(51) Int. Cl.
  *H02J 3/38* (2006.01)
  *H02J 7/34* (2006.01)
  *H02J 7/35* (2006.01)
  *H02J 9/06* (2006.01)

(52) U.S. Cl.
  CPC ............... *H02J 9/062* (2013.01); *Y02B 10/72* (2013.01); *Y02E 10/563* (2013.01); *Y02E 10/566* (2013.01)

(58) Field of Classification Search
  CPC ..... Y02E 60/12; Y02E 10/563; Y02E 10/566; Y02E 10/50; Y02E 10/58; H01M 10/465; H01M 16/006; Y02B 10/72; Y02B 10/12; Y02B 10/20; G05F 1/67; G05F 5/00; G05F 1/56; G05F 3/18; H02M 3/156; H02M 2001/0022; H02M 7/538; H03K 17/145; H02P 8/00
  USPC .......... 320/101; 136/291, 293; 323/299, 303
  See application file for complete search history.

(56) References Cited

U.S. PATENT DOCUMENTS

| | | | | |
|---|---|---|---|---|
| 2011/0140649 A1* | 6/2011 | Choi | ................... | H01M 14/005 320/101 |
| 2012/0235486 A1 | 9/2012 | Li et al. | | |
| 2012/0310438 A1* | 12/2012 | Kaiser | ..................... | H02J 3/383 700/298 |
| 2013/0009463 A1 | 1/2013 | Iwasaki et al. | | |
| 2013/0207473 A1 | 8/2013 | Jain | | |
| 2014/0062192 A1* | 3/2014 | Vichnyakov | ............ | H02J 3/385 307/26 |
| 2014/0152100 A1 | 6/2014 | Lim | | |
| 2014/0197778 A1* | 7/2014 | Kim | .................... | H01M 10/443 320/107 |
| 2014/0340041 A1* | 11/2014 | Aggeler | .............. | B60L 11/1842 320/109 |

FOREIGN PATENT DOCUMENTS

| | | |
|---|---|---|
| CN | 203775048 U | 8/2014 |
| CN | 204167925 U | 2/2015 |
| JP | 2014128164 A | 7/2014 |
| WO | 2013125425 A1 | 8/2013 |

OTHER PUBLICATIONS

Chinese Patent Application No. 201410436633.7, Third Office Action dated Mar. 28, 2017 (19 pages).

Chinese First Office Action dated Nov. 3, 2015, and English summary, for patent application No. CN201410436633.7.

* cited by examiner

CHARGING AND DISCHARGING SYSTEM AND METHOD, AND PHOTOVOLTAIC POWER GENERATION SYSTEM

CROSS-REFERENCE TO RELATED APPLICATIONS

This application claims priority to Chinese Patent Application No. 201410436633.7, titled "CHARGING AND DISCHARGING SYSTEM AND METHOD, AND PHOTOVOLTAIC POWER GENERATION SYSTEM", filed with the Chinese State Intellectual Property Office on Aug. 29, 2014, which is incorporated by reference in its entirety herein.

FIELD

The present disclosure relates to the field of photovoltaic technology, and in particular to a charging and discharging system, a charging and discharging method, and a photovoltaic power generation system.

BACKGROUND

Presently, due to limitation on output power of a bidirectional inverter in some areas, a photovoltaic device generally sets power limitation for its generation power. However, in this way, it generally results in a waste of excess energy of the photovoltaic device, thereby limiting power generation benefits of the photovoltaic device.

In order to alleviate the waste of excess energy of the photovoltaic device and improve power generation benefits of the photovoltaic device, a resolution for storing excess energy of the photovoltaic device and providing the stored energy to the bidirectional inverter efficiently and rapidly, is highly required, so as to convert the energy into an alternative current transmitted into a public power grid or a load.

SUMMARY

In order to alleviate the technical problem above, a charging and discharging system, a charging and discharging method, and a photovoltaic power generation system are provided according to exemplary embodiments of the present disclosure, to alleviate a waste of excess energy of the photovoltaic device and improve power generation benefits of a photovoltaic device. Technical solutions are provided as follows.

A charging and discharging system is provided, which includes a unidirectional converter, a unidirectional switch, an energy storage device and a controller, where an input terminal of the unidirectional converter is connected to an output terminal of a photovoltaic device of a photovoltaic power generation system to which the charging and discharging system is applied, and an output terminal of the unidirectional converter is connected to an input terminal of the energy storage device;

the unidirectional switch is connected between an output terminal of the energy storage device and an input terminal of a bidirectional inverter of the photovoltaic power generation system to which the charging and discharging system is applied; and the controller is connected to the unidirectional converter, the unidirectional switch, the energy storage device and the bidirectional inverter.

Preferably, the unidirectional switch includes a direct current contactor.

Preferably, the unidirectional switch includes a direct current contactor and a diode.

Preferably, the unidirectional converter includes a single-stage DCDC converter.

Preferably, the unidirectional converter includes a multiple-stage DCDC converter.

A photovoltaic power generation system includes a photovoltaic device, a bidirectional inverter and any of the above charging and discharging system, where the charging and discharging system is connected between the photovoltaic device and the bidirectional inverter.

A charging and discharging method applied to any of the above charging and discharging system includes:

in a case that output power of the photovoltaic device is greater than preset maximum output power of the bidirectional inverter, controlling, by the controller, the unidirectional converter to charge the energy storage device with first charging power, where the first charging power is a difference between the output power of the photovoltaic device and the preset maximum output power of the bidirectional inverter; or in a case that output power of the photovoltaic device is less than preset minimum output power of the bidirectional inverter, sending, by the controller, a voltage-reducing-signal to the bidirectional inverter, and in a case that a voltage of the input terminal of the bidirectional inverter is detected to be lower than or equal to an open-circuit voltage of the energy storage device, controlling, by the controller, the unidirectional switch to close, where the voltage-reducing-signal is used to instruct the bidirectional inverter to reduce the voltage of the input terminal of the bidirectional inverter to be lower than or equal to the open-circuit voltage of the energy storage device.

Preferably, the in a case that output power of the photovoltaic device is greater than preset maximum output power of the bidirectional inverter, controlling, by the controller, the unidirectional converter to charge the energy storage device with first charging power, includes:

comparing a voltage of the input terminal of the unidirectional converter with the open-circuit voltage of the energy storage device; and in a case that the voltage of the input terminal of the unidirectional converter is higher than the open-circuit voltage of the energy storage device, controlling the unidirectional converter to reduce the voltage of the input terminal of the unidirectional converter to be equal to the open-circuit voltage of the energy storage device, and in a case that the voltage of the input terminal of the unidirectional converter is equal to the open-circuit voltage of the energy storage device, controlling the unidirectional converter to charge the energy storage device with the first charging power; or in a case that the voltage of the input terminal of the unidirectional converter is lower than the open-circuit voltage of the energy storage device, controlling the unidirectional converter to raise the voltage of the input terminal of the unidirectional converter to be equal to the open-circuit voltage of the energy storage device, and in a case that the voltage of the input terminal of the unidirectional converter is equal to the open-circuit voltage of the energy storage device, controlling the unidirectional converter to charge the energy storage device with the first charging power; or in a case that the voltage of the input terminal of the unidirectional converter is equal to the open-circuit voltage of the energy storage device, controlling the unidirectional converter to charge the energy storage device with the first charging power.

As compared with the conventional technology, the present disclosure may have beneficial effects as follows.

In the present disclosure, the provided charging and discharging system includes a unidirectional converter, a unidirectional switch, an energy storage device and a controller.

In a case that the output power of the photovoltaic device is greater than preset maximum output power of the bidirectional inverter, the controller controls the unidirectional converter to charge the energy storage device with a first charging power. The first charging power is a difference between the output power of the photovoltaic device and the preset maximum output power of the bidirectional inverter, therefore excess energy of the photovoltaic device is stored by controlling the unidirectional converter to charge the energy storage device with the first charging power.

Or, in a case that the output power of the photovoltaic device is less than the preset minimum output power of the bidirectional inverter, in order to enable the bidirectional inverter to operate normally, the controller sends a voltage-reducing-signal to the bidirectional inverter. And in a case that the voltage of the input terminal of the bidirectional inverter is detected to be lower than the open-circuit voltage of the photovoltaic device, the controller controls the unidirectional switch to close, so that the energy storage device discharges and provides the stored energy to the bidirectional inverter efficiently and rapidly, thereby alleviate a waste of excess energy of the photovoltaic device and improving power generation benefits of the photovoltaic device.

BRIEF DESCRIPTION OF THE DRAWINGS

In order to illustrate technical solutions of exemplary embodiments of the present disclosure more clearly, drawings for description of the embodiments are introduced below briefly. The drawings described below merely describe exemplary embodiments of the present disclosure, and other drawings may be obtained based on these drawings by those skilled in the art without any creative work.

DETAILED DESCRIPTION OF DISCLOSED EXEMPLARY EMBODIMENTS

Technical solutions of embodiments of the present disclosure will be described clearly and completely hereinafter in conjunction with the drawings for the embodiments of the present disclosure. Apparently, the described embodiments are merely a few embodiments of the present disclosure rather than all embodiments. Any other embodiment obtained based on the embodiments of the present disclosure by those skilled in the art without any creative work falls within the scope of protection of the present disclosure.

First Embodiment

Figure 1:
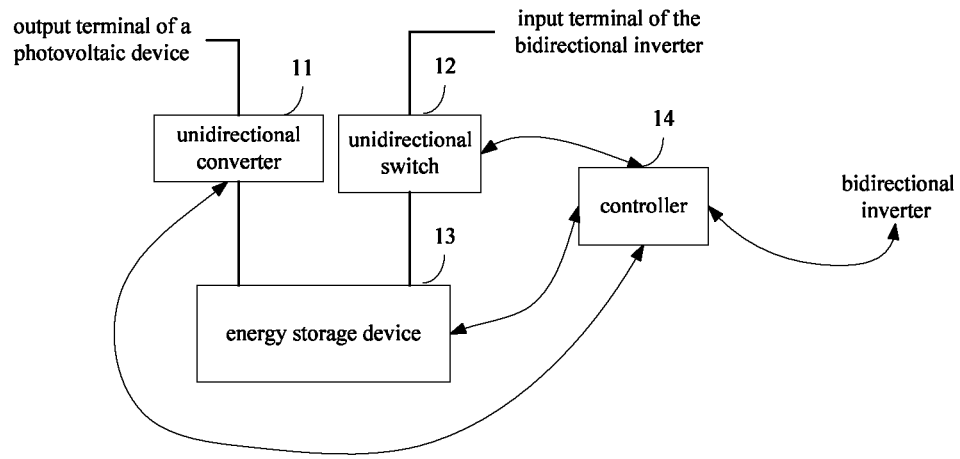
FIG. 1 is a schematic structural diagram of a charging and discharging system according to an embodiment of the present disclosure.

Reference is made to FIG. 1, which shows a schematic structural diagram of a charging and discharging system according to an embodiment of the present disclosure. The charging and discharging system includes a unidirectional converter 11, a unidirectional switch 12, an energy storage device 13 and a controller 14.

An input terminal of the unidirectional converter 11 is connected to an output terminal of a photovoltaic device of a photovoltaic power generation system to which the charging and discharging system is applied, and an output terminal of the unidirectional converter 11 is connected to an input terminal of the energy storage device 13.

The unidirectional switch 12 is connected between an output terminal of the energy storage device 13 and an input terminal of a bidirectional inverter of the photovoltaic power generation system to which the charging and discharging system is applied.

The controller 14 is connected to the unidirectional converter 11, the unidirectional switch 12, the energy storage device 13, and the bidirectional inverter.

In the present disclosure, the provided charging and discharging system includes a unidirectional converter, a unidirectional switch, an energy storage device and a controller.

In a case that the output power of the photovoltaic device is greater than preset maximum output power of the bidirectional inverter, the controller controls the unidirectional converter to charge the energy storage device with a first charging power. The first charging power is a difference between the output power of the photovoltaic device and the preset maximum output power of the bidirectional inverter, therefore excess energy of the photovoltaic device is stored by controlling the unidirectional converter to charge the energy storage device with the first charging power.

Or, in a case that the output power of the photovoltaic device is less than the preset minimum output power of the bidirectional inverter, in order to enable the bidirectional inverter to operate normally, the controller sends a voltage-reducing-signal to the bidirectional inverter. And in a case that the voltage of the input terminal of the bidirectional inverter is detected to be lower than the open-circuit voltage of the photovoltaic device, the controller controls the unidirectional switch to close, so that the energy storage device discharges and provides the stored energy to the bidirectional inverter efficiently and rapidly, thereby alleviate a waste of excess energy of the photovoltaic device and improving power generation benefits of the photovoltaic device.

Figure 2:
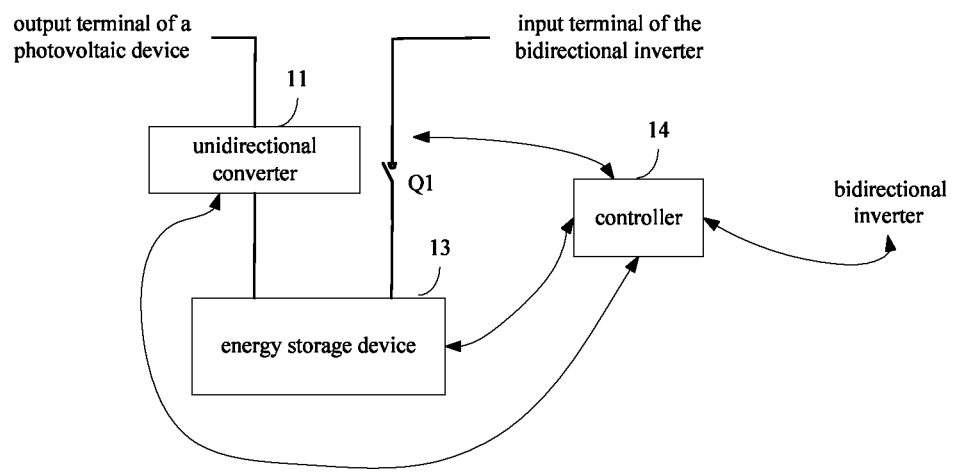
FIG. 2 is another schematic structural diagram of the charging and discharging system according to an embodiment of the present disclosure.

In the embodiment, the unidirectional switch 12 may include a direct current contactor Q1 for example. As shown in FIG. 2, the controller 14 is connected to the direct current contactor Q1.

Practically, the unidirectional switch 12 may include the direct current contactor Q1 and a diode D1 for example.

Figure 3:
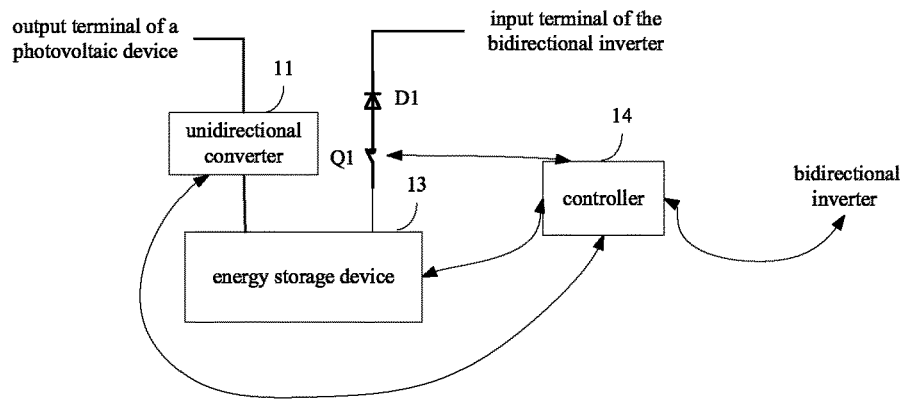
FIG. 3 is still another schematic structural diagram of the charging and discharging system according to an embodiment of the present disclosure.

In a case that the unidirectional switch 12 includes the direct current contactor Q1 and the diode D1, a first terminal of the diode D1 is connected to the input terminal of the bidirectional inverter, a second terminal of the diode D1 is connected to a first terminal of the direct current contactor Q1, a second terminal of the direct current contactor Q1 is connected to the output terminal of the energy storage device 13, and the controller 14 is connected to the direct current contactor Q1, as shown in FIG. 3.

In the embodiment, by adding a diode D1, backward flowing of the input power of the bidirectional inverter to the energy storage device 13 via the direct current contactor Q1 is prevented.

Practically, in case of that only the direct current contactor Q1 is included without the diode D1, the input power of the bidirectional inverter can also be prevented from flowing backward to the energy storage device 13 via the direct current contactor Q1, as long as the controller 14 controls appropriately.

In the embodiment, the unidirectional converter 11 may be but not limited to a single-stage DCDC converter or a multiple-stage DCDC converter.

A charging and discharging method is provided according to the embodiment of the present disclosure, which is performed for implementing the charging and discharging system above. The method is applied to the charging and discharging system above, and the method includes step A11 to step A12.

In step A11, in a case that output power of the photovoltaic device is greater than preset maximum output power of the bidirectional inverter, the controller 14 controls the unidirectional converter 11 to charge the energy storage device 13 with a first charging power, where the first charging power is a difference between the output power of the photovoltaic device and the preset maximum output power of the bidirectional inverter.

The controller 14 controlling the unidirectional converter 11 to charge the energy storage device 13 with the first charging power ensures that the bidirectional inverter operates with the preset maximum output power, and the excess energy of the photovoltaic device can be stored.

The preset maximum output power of the bidirectional inverter indicates maximum output power meeting a limitation of the output power of the bidirectional inverter.

In step A12, in a case that the output power of the photovoltaic device is less than a preset minimum output power of the bidirectional inverter, the controller 14 sends a voltage-reducing-signal to the bidirectional inverter. And in a case that a voltage of an input terminal of the bidirectional inverter is detected to be lower than or equal to an open-circuit voltage of the energy storage device 13, the controller 14 controls the unidirectional switch 12 to close, where the voltage-reducing-signal is used to instruct the bidirectional inverter to reduce the voltage of the input terminal of the bidirectional inverter to be lower than or equal to the open-circuit voltage of the energy storage device 13.

After the controller 14 controls the unidirectional switch 12 to close, a discharging circuit is conducted through, and the energy storage device 13 discharges to the bidirectional inverter to provide the stored energy to the bidirectional inverter. After the unidirectional switch 12 is closed, the voltage of the output terminal of the energy storage device 13 is equal to the voltage of the input terminal of the bidirectional inverter, and the energy storage device 13 discharges with a discharging power equal to the output power of the bidirectional inverter.

In the solution, in a case that the output power of the photovoltaic device is greater than the preset maximum output power of the bidirectional inverter, the controller controlling the unidirectional converter to charge the energy storage device with a first charging power may include step B11 to step B14.

In step B11, a voltage of an input terminal of the unidirectional converter 11 is compared with an open-circuit voltage of the energy storage device 13.

In step B12, in a case that the voltage of the input terminal of the unidirectional converter 11 is higher than the open-circuit voltage of the energy storage device 13, the unidirectional converter 11 is controlled to reduce the voltage of the input terminal of the unidirectional converter 11 to be equal to the open-circuit voltage of the energy storage device 13; and in a case that the voltage of the input terminal of the unidirectional converter 11 is equal to the open-circuit voltage of the energy storage device 13, the unidirectional converter 11 is controlled to charge the energy storage device 13 with the first charging power.

In a case that the voltage of the input terminal of the unidirectional converter 11 is reduced to be equal to the open-circuit voltage of the energy storage device 13, the unidirectional converter 11 operates in a conducted state. When the unidirectional converter 11 operates in the conducted state, the controller 14 controls the unidirectional converter 11 to charge the energy storage device 13 with the first charging power.

In step B13, in a case that the voltage of input terminal of the unidirectional converter 11 is lower than the open-circuit voltage of the energy storage device 13, the unidirectional converter 11 is controlled to raise the voltage of the input terminal of the unidirectional converter 11 to be equal to the open-circuit voltage of the energy storage device 13; and in a case that the voltage of the input terminal of the unidirectional converter 11 is equal to the open-circuit voltage of the energy storage device 13, the unidirectional converter 11 is controlled to charge the energy storage device 13 with the first charging power.

In a case that the voltage of the input terminal of the unidirectional converter 11 is raised to be equal to the open-circuit voltage of the energy storage device 13, the unidirectional converter 11 operates in a conducted state. When the unidirectional converter 11 operates in the conducted state, the controller 14 controls the unidirectional converter 11 to charge the energy storage device 13 with the first charging power.

In step B14, in a case that the voltage of the input terminal of the unidirectional converter 11 is equal to the open-circuit voltage of the energy storage device 13, the unidirectional converter 11 is controlled to charge the energy storage device 13 with the first charging power.

In a case that the voltage of the input terminal of the unidirectional converter 11 is equal to the open-circuit voltage of the energy storage device 13, the unidirectional converter 11 operates in a conducted state, and the controller 14 directly controls the unidirectional converter 11 to charge the energy storage device 13 with the first charging power.

With the charging and discharging system according to the embodiment of the present disclosure, the controller 14 can control the unidirectional converter 11 to charge the energy storage device 13, and the controller 14 controls the unidirectional switch 12 to enable the energy storage device 13 discharges to the bidirectional inverter, thereby separating the charging circuit from the discharging circuit, and the entire solution is simple and easy to implement.

With the charging and discharging system according to the embodiment of the present disclosure, the charging circuit and the discharging circuit are separated from each other, therefore the charging power of the unidirectional converter 11 can be designed independently, and the discharging power of the unidirectional switch 12 can be designed independently (i.e., the discharging power of the unidirectional switch 12 can be designed only based on the output power of the bidirectional inverter). Since the charging power of the unidirectional converter 11 and the discharging power of the unidirectional switch 12 can be designed independently, it may be designed that it is charged at low power and discharges at high power (the discharging power of the energy storage device 13 can reach the preset maximum output power, as long as the discharging power of the unidirectional switch 12 is selected to be same to the preset maximum output power of the bidirectional inverter); or it is charged at high power and discharges at low power. Accordingly, the charging power of the unidirectional converter 11 and the discharging power of the unidirectional switch 12 can be designed flexibly; and the design of the unidirectional converter 11 is simple, which is convenient to implement in engineering.

In a case that the unidirectional switch 12 is the direct current contactor Q1 and the output power of the photovoltaic device is less than preset minimum output power of the bidirectional inverter, the controller 14 controls the direct current contactor Q1 to close if the voltage of the input terminal of the bidirectional inverter is detected to be lower than or equal to the open-circuit of the energy storage device 13.

After the direct current contactor Q1 is closed, the discharging circuit including the direct current contactor Q1 is conducted through, and the energy storage device 13 discharges to the bidirectional inverter to provide the stored energy to the bidirectional inverter. After the direct current contactor Q1 is closed, the voltage of the output terminal of the energy storage device 13 is equal to the voltage of the input terminal of the bidirectional inverter, and the energy storage device 13 discharges with a discharging power equal to the output power of the bidirectional inverter.

A service life of the direct current contactor may reach 30 years and the operation times of the direct current contactor may reach 700,000 times, so it is highly reliable to discharge via the direct current contactor. In addition, since energy loss is little during a discharging process of the direct current contactor, the discharging process of the energy storage device 13 has high operation efficiency.

In a case that the unidirectional switch 12 includes the direct current contactor Q1 and the diode D1, and the output power of the photovoltaic device is less than the preset minimum output power of the bidirectional inverter, the controller 14 controls the direct current contactor Q1 to close if the voltage of the input terminal of the bidirectional inverter is detected to be lower than or equal to the open-circuit voltage of the energy storage device 13.

After the direct current contactor Q1 is closed, the discharging circuit including the direct current contactor Q1 and the diode D1 is conducted through, and the energy storage device 13 discharges to the bidirectional inverter to provide the stored energy to the bidirectional inverter.

Second Embodiment

Figure 4:
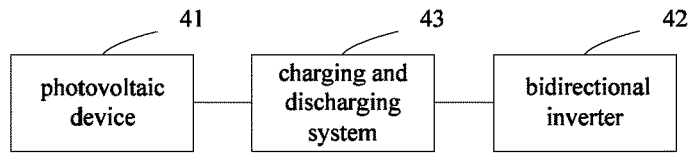
FIG. 4 is a logic connection diagram of a photovoltaic power generation system according to an embodiment of the present disclosure.

In the embodiment, a photovoltaic power generation system is provided according to an embodiment of the present disclosure. Referring to FIG. 4, the photovoltaic power generation system includes a photovoltaic device 41, a bidirectional inverter 42 and a charging and discharging system 43.

The charging and discharging system 43 is the same as the charging and discharging system shown in the first embodiment, which is not described here.

The charging and discharging system 43 is connected between the photovoltaic device 41 and the bidirectional inverter 42.

Figure 5:
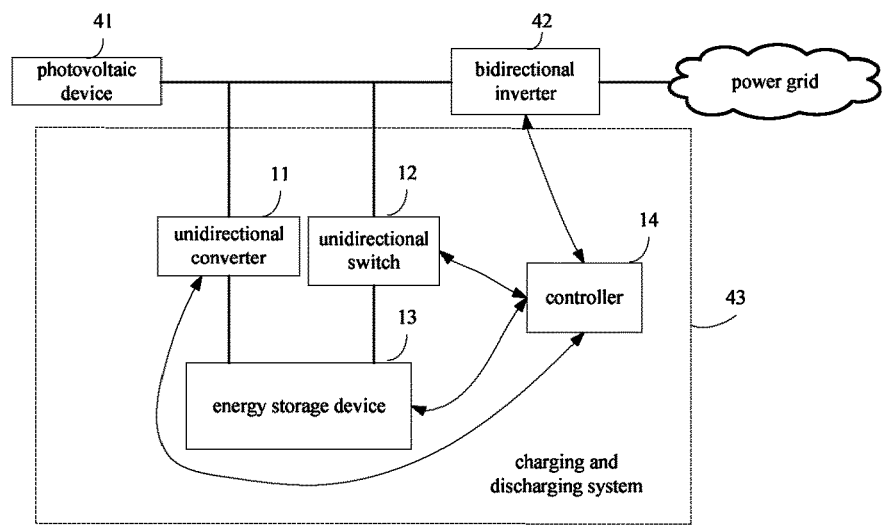
FIG. 5 is a schematic structural diagram of a photovoltaic power generation system according to an embodiment of the present disclosure.
Figure 6:
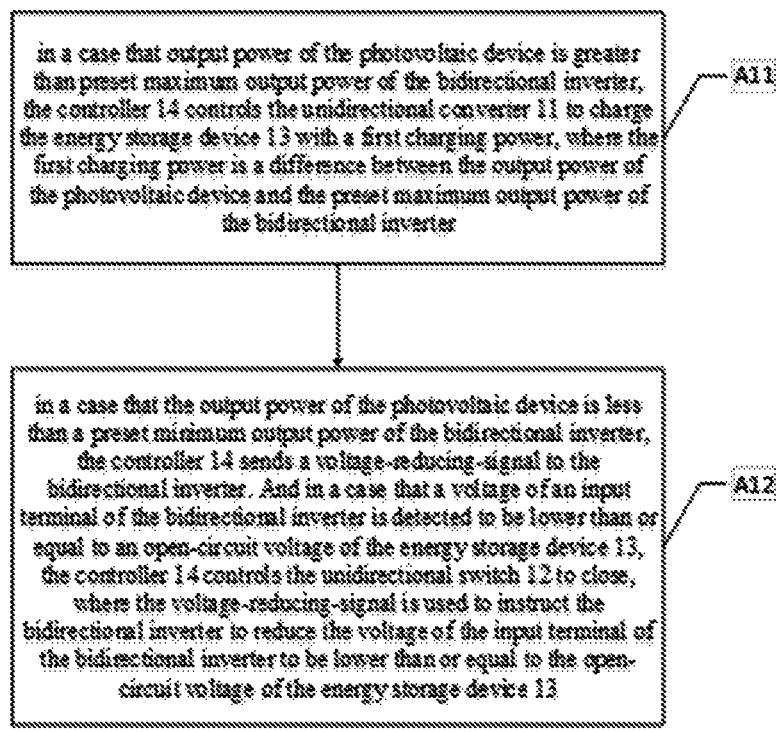
FIG. 6 is a flowchart of a charging and discharging method applied to a charging and discharging system according to an embodiment of the present disclosure.
Figure 7:
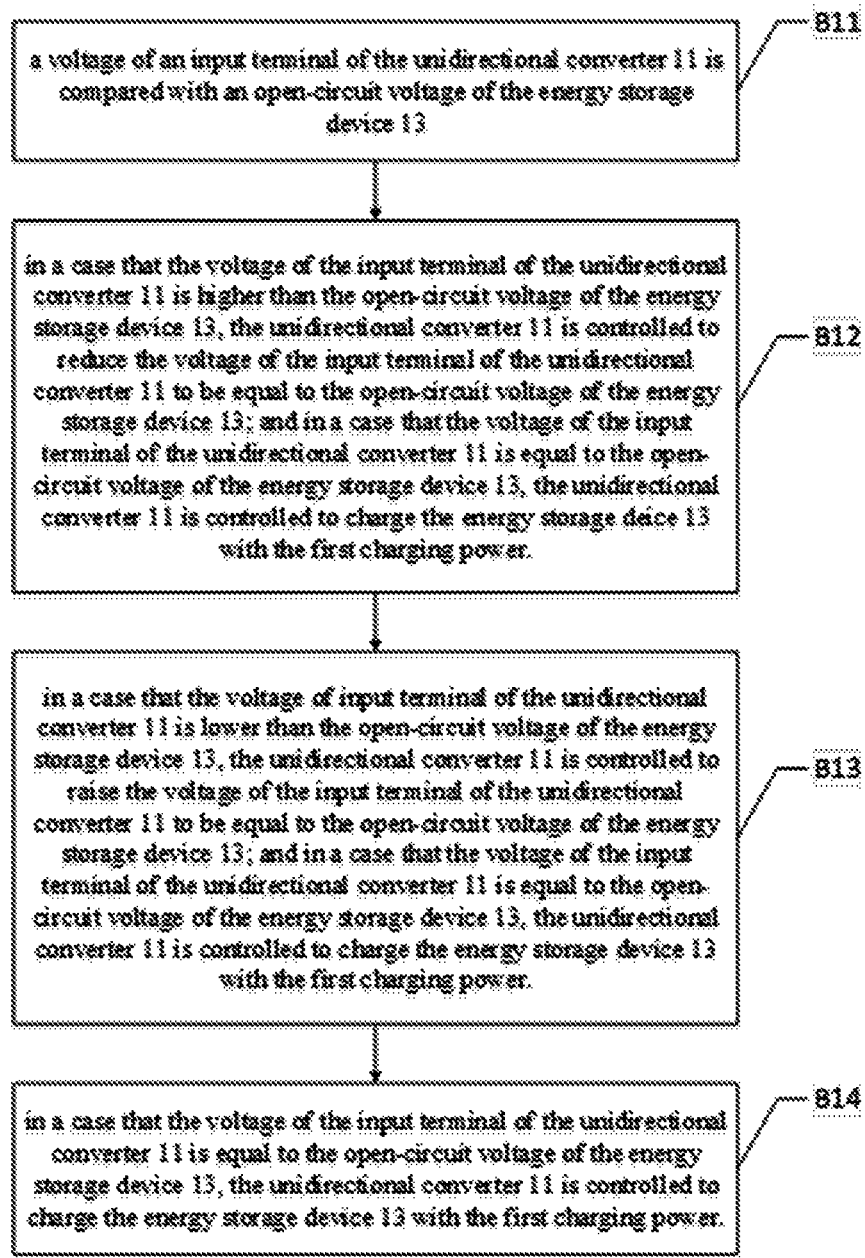
FIG. 7 is a flowchart of a charging and discharging method applied to a charging and discharging system according to an embodiment of the present disclosure.

Specifically, an input terminal of the unidirectional converter 11 in the charging and discharging system 43 is connected to an output terminal 41 of the photovoltaic device, the unidirectional switch 12 in the charging and discharging system 43 is connected to an input terminal of the bidirectional inverter 42, and the controller 14 in the charging and discharging system 43 is connected to the bidirectional inverter 42, as shown in FIG. 5.

It should be noted that, terms of "include", "comprise" or any other variants are intended to be non-exclusive. Therefore, a process, method, article or device including a series of elements may include not only the elements but also other elements that are not explicitly enumerated, or also include elements inherent for the process, method, article or device. Unless expressly limited, the statement "comprising (including) one . . . " does not exclude the case that other same elements may exist in the process, method, article or device.

The above description of the disclosed exemplary embodiments can enable those skilled in the art to implement or practice the present disclosure. Many changes to these embodiments will be apparent to those skilled in the art based on this disclosure, and general principles defined herein may be implemented in other embodiments without departing from the spirit or scope of the present disclosure. Therefore, the present disclosure is not limited to the disclosed embodiments, but is to conform to the widest scope in accordance with principles and novel features disclosed herein.

What is claimed is:

1. A charging and discharging system comprising a unidirectional converter, a unidirectional switch, an energy storage device and a controller, wherein an input terminal of the unidirectional converter is connected to an output terminal of a photovoltaic device of a photovoltaic power generation system to which the charging and discharging system is applied, and an output terminal of the unidirectional converter is connected to an input terminal of the energy storage device;

the unidirectional switch is connected between an output terminal of the energy storage device and an input terminal of a bidirectional inverter of the photovoltaic power generation system to which the charging and discharging system is applied; and the controller is connected to the unidirectional converter, the unidirectional switch, the energy storage device and the bidirectional inverter, wherein in a case that output power of the photovoltaic device is less than preset minimum output power of the bidirectional inverter, sending, by the controller, a voltage-reducing-signal to the bidirectional inverter, and in a case that a voltage of the input terminal of the bidirectional inverter is detected to be lower than or equal to an open-circuit voltage of the energy storage device, controlling, by the controller, the unidirectional switch to close, and wherein the voltage-reducing-signal is used to instruct the bidirectional inverter to reduce the voltage of the input terminal of the bidirectional inverter to be lower than or equal to the open-circuit voltage of the energy storage device.

2. The charging and discharging system according to claim 1, wherein the unidirectional switch comprises a direct current contactor.

3. The charging and discharging system according to claim 1, wherein the unidirectional switch comprises a direct current contactor and a diode.

4. The charging and discharging system according to claim 1, wherein the unidirectional converter comprises a single-stage DCDC converter.

5. The charging and discharging system according to claim 1, wherein the unidirectional converter comprises a multiple-stage DCDC converter.

6. A photovoltaic power generation system comprising a photovoltaic device, a bidirectional inverter and a charging and discharging system, the charging and discharging system comprising a unidirectional converter, a unidirectional switch, an energy storage device and a controller, wherein
  an input terminal of the unidirectional converter is connected to an output terminal of a photovoltaic device of a photovoltaic power generation system to which the charging and discharging system is applied, and an output terminal of the unidirectional converter is connected to an input terminal of the energy storage device;
  the unidirectional switch is connected between an output terminal of the energy storage device and an input terminal of a bidirectional inverter of the photovoltaic power generation system to which the charging and discharging system is applied; and
  the controller is connected to the unidirectional converter, the unidirectional switch, the energy storage device and the bidirectional inverter; and
  the charging and discharging system is connected between the photovoltaic device and the bidirectional inverter,
  in a case that output power of the photovoltaic device is greater than preset maximum output power of the bidirectional converter, controlling, by the controller, the unidirectional converter to charge the energy storage device with first charging power, and
  wherein the first charging power is a difference between the output power of the photovoltaic device and the preset maximum output power of the bidirectional inverter.

7. The photovoltaic power generation system according to claim 6, wherein the unidirectional switch comprises a direct current contactor.

8. The photovoltaic power generation system according to claim 6, wherein the unidirectional switch comprises a direct current contactor and a diode.

9. The photovoltaic power generation system according to claim 6, wherein the unidirectional converter comprises a single-stage DCDC converter.

10. The photovoltaic power generation system according to claim 6, wherein the unidirectional converter comprises a multiple-stage DCDC converter.

11. A charging and discharging method applied to a charging and discharging system comprising: a unidirectional converter, a unidirectional switch, an energy storage device and a controller, wherein
  an input terminal of the unidirectional converter is connected to an output terminal of a photovoltaic device of a photovoltaic power generation system to which the charging and discharging system is applied, and an output terminal of the unidirectional converter is connected to an input terminal of the energy storage device;
  the unidirectional switch is connected between an output terminal of the energy storage device and an input terminal of a bidirectional inverter of the photovoltaic power generation system to which the charging and discharging system is applied; and
  the controller is connected to the unidirectional converter, the unidirectional switch, the energy storage device and the bidirectional inverter;
  and the method comprising:
    in a case that output power of the photovoltaic device is greater than preset maximum output power of the bidirectional inverter, the controller controls the unidirectional converter to charge the energy storage device with first charging power, wherein the first charging power is a difference between the output power of the photovoltaic device and the preset maximum output power of the bidirectional inverter; wherein the controller controls unidirectional converter to charge the energy storage device with first charging power, comprises:
      comparing a voltage of the input terminal of the unidirectional converter with the open-circuit voltage of the energy storage device; and
      in a case that the voltage of the input terminal of the unidirectional converter is higher than the open-circuit voltage of the energy storage device, controlling the unidirectional converter to reduce the voltage of the input terminal of the unidirectional converter to be equal to the open-circuit voltage of the energy storage device, and in a case that the voltage of the input terminal of the unidirectional converter is equal to the open-circuit voltage of the energy storage device, controlling the unidirectional converter to charge the energy storage device with the first charging power; or
      in a case that the voltage of the input terminal of the unidirectional converter is lower than the open-circuit voltage of the energy storage device, controlling the unidirectional converter to raise the voltage of the input terminal of the unidirectional converter to be equal to the open-circuit voltage of the energy storage device, and in a case that the voltage of the input terminal of the unidirectional converter is equal to the open-circuit voltage of the energy storage device, controlling the unidirectional converter to charge the energy storage device with the first charging power; or
      in a case that the voltage of the input terminal of the unidirectional converter is equal to the open-circuit voltage of the energy storage device, controlling the unidirectional converter to charge the energy storage device with the first charging power; or
    in a case that output power of the photovoltaic device is less than preset minimum output power of the bidirectional inverter, the controller sends a voltage-reducing-signal to the bidirectional inverter, and in a case that a voltage of the input terminal of the bidirectional inverter is detected to be lower than or equal to an open-circuit voltage of the energy storage device, the controller controls the unidirectional switch to close, wherein the voltage-reducing-signal is used to instruct the bidirectional inverter to reduce the voltage of the input terminal of the bidirectional inverter to be lower than or equal to the open-circuit voltage of the energy storage device.

12. The charging and discharging method according to claim 11, wherein the unidirectional switch comprises a direct current contactor.

13. The charging and discharging method according to claim 11, wherein the unidirectional switch comprises a direct current contactor and a diode.

14. The charging and discharging method according to claim 11, wherein the unidirectional converter comprises a single-stage DCDC converter.

15. The charging and discharging method according to claim 11, wherein the unidirectional converter comprises a multiple-stage DCDC converter.

* * * * *